US009811806B1

(12) United States Patent
Kuang et al.

(10) Patent No.: US 9,811,806 B1
(45) Date of Patent: Nov. 7, 2017

(54) DETERMINING LICENSE USE FOR COMPOSED CONTAINER SERVICES IN CLOUD PLATFORMS

(71) Applicant: International Business Machines Corporation, Armonk, NY (US)

(72) Inventors: Da Hu Kuang, Beijing (CN); Xin Peng Liu, Beijing (CN); Zhao Liu, Austin, TX (US); Shu Chao Wan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/267,000

(22) Filed: Sep. 15, 2016

(51) Int. Cl.
G06F 21/00 (2013.01)
G06Q 10/10 (2012.01)
G06F 17/30 (2006.01)
G06F 9/445 (2006.01)

(52) U.S. Cl.
CPC ............ *G06Q 10/10* (2013.01); *G06F 8/63* (2013.01); *G06F 17/30097* (2013.01); *G06F 17/30327* (2013.01); *G06F 17/30365* (2013.01)

(58) Field of Classification Search
None
See application file for complete search history.

(56) References Cited

U.S. PATENT DOCUMENTS

| | | | |
|---|---|---|---|
| 8,117,463 B2 * | 2/2012 | Kim | G06F 21/10 713/193 |
| 8,468,356 B2 | 6/2013 | Sahita et al. | |
| 9,201,886 B2 | 12/2015 | Candelore | |
| 9,584,440 B1 * | 2/2017 | Blakely | H04L 67/22 |
| 2006/0106821 A1 * | 5/2006 | Cox | G06F 21/105 |
| 2006/0116966 A1 * | 6/2006 | Pedersen | G06F 21/10 705/59 |
| 2006/0136204 A1 * | 6/2006 | Kuboyama | G10L 15/06 704/242 |
| 2009/0299791 A1 * | 12/2009 | Blake | G06Q 10/06 705/40 |
| 2012/0041844 A1 | 2/2012 | Shen et al. | |
| 2012/0072968 A1 * | 3/2012 | Wysopal | G06F 11/3612 726/1 |
| 2012/0137138 A1 * | 5/2012 | Gregorovic | G06F 17/30 713/189 |

(Continued)

OTHER PUBLICATIONS

©2016 GitHub, Inc., "Docker Image Specification v1.0.0", retrieved Sep. 13, 2016, 7 pages <https://github.com/docker/docker/blob/master/image/spec/v1.md>.

(Continued)

*Primary Examiner* — Maung Lwin
(74) *Attorney, Agent, or Firm* — Patterson + Sheridan, LLP (57) ABSTRACT

Systems, methods, and computer program products to perform an operation including receiving an indication to commit a containerized image to an image repository, wherein the containerized image comprises a plurality of layers, and upon validating the containerized image by determining whether each layer of the containerized image is associated with a respective signature value, generating a first signature value for the containerized image, updating a data store for signature values to reflect the first signature value for the containerized image, and committing the containerized image to the repository.

20 Claims, 7 Drawing Sheets

(56) References Cited

U.S. PATENT DOCUMENTS

| | | | |
|---|---|---|---|
| 2012/0144378 A1* | 6/2012 | Shah | G06F 8/60 |
| | | | 717/170 |
| 2012/0324446 A1* | 12/2012 | Fries | G06F 21/64 |
| | | | 718/1 |
| 2014/0122348 A1 | 5/2014 | Fuller et al. | |
| 2015/0121478 A1* | 4/2015 | Huang | H04L 63/0823 |
| | | | 726/4 |
| 2015/0186129 A1* | 7/2015 | Apte | G06F 9/44505 |
| | | | 717/174 |
| 2015/0365437 A1* | 12/2015 | Bell, Jr. | H04L 63/20 |
| | | | 726/1 |
| 2016/0110392 A1* | 4/2016 | Zheng | G06F 17/30327 |
| | | | 707/797 |

OTHER PUBLICATIONS

©2016 GitHub, Inc., "TarSum Checksum Specification", retrieved Sep. 13, 2016, 4 pages <https://github.com/docker/dockeriblob/masteripkg/tarsum/tarsum_spec.md>.

* cited by examiner

DETERMINING LICENSE USE FOR COMPOSED CONTAINER SERVICES IN CLOUD PLATFORMS

BACKGROUND

The present invention relates to computer software, and more specifically, to determining license use for composed container services in cloud platforms.

Software applications may be packaged in a software image, which can be deployed as a container in a computing environment. The software image includes the software application and a filesystem that includes any the components needed to run the software application on a server in a given computing environment. Doing so ensures that the software application will run the same across all types of computing environments. However, this approach also compromises conventional techniques for tracking the licenses of software components that make up the software image, as the conventional techniques focus on tracking the licenses used by software that executes directly on an operating system, rather than in a container image.

SUMMARY

In one embodiment, a method comprises receiving an indication to commit a containerized image to an image repository, wherein the containerized image comprises a plurality of layers, and upon validating the containerized image by determining whether each layer of the containerized image is associated with a respective signature value, generating a first signature value for the containerized image, updating a data store for signature values to reflect the first signature value for the containerized image, and committing the containerized image to the repository.

In another embodiment, a system comprises a processor and a memory storing instructions, which when executed by the processor, performs an operation comprising receiving an indication to commit a containerized image to an image repository, wherein the containerized image comprises a plurality of layers, and upon validating the containerized image by determining whether each layer of the containerized image is associated with a respective signature value, generating a first signature value for the containerized image, updating a data store for signature values to reflect the first signature value for the containerized image, and committing the containerized image to the repository.

In another embodiment, a computer-readable storage medium has computer-readable program code embodied therewith, the computer-readable program code executable by a processor to perform an operation comprising receiving an indication to commit a containerized image to an image repository, wherein the containerized image comprises a plurality of layers, and upon validating the containerized image by determining whether each layer of the containerized image is associated with a respective signature value, generating a first signature value for the containerized image, updating a data store for signature values to reflect the first signature value for the containerized image, and committing the containerized image to the repository.

DETAILED DESCRIPTION

Embodiments disclosed herein provide techniques to manage software licenses for software that is packaged and distributed using containerized images. The containerized image may be committed to a containerization platform, from which users can deploy instances of the container and application software executed within the container in a cloud platform. When the containerized image is deployed to cloud platforms, embodiments disclosed herein monitor the license use of each deployment of the container in the cloud. Generally, embodiments disclosed herein validate images prior to committing the container image to the containerization platform, ensuring that the license use of the container image can be tracked once it is committed. Once the container image is committed, a signature center containing a tree data structure is leveraged to manage and track the license use of each subsequent deployment of the container image. Embodiments disclosed herein leverage a signature checksum for each image and each layer of each image as the basis for tracking software licenses. The signature checksum of each image serves as both an identifier for tracking license use and as evidence that committed image containers are valid. Generally, the signature checksum is unique to each image and each signature checksum may be assigned to multiple images that have the same layers. Once a signature checksum is assigned to an image, the image may be considered as valid for license tracking purposes.

Figure 1:
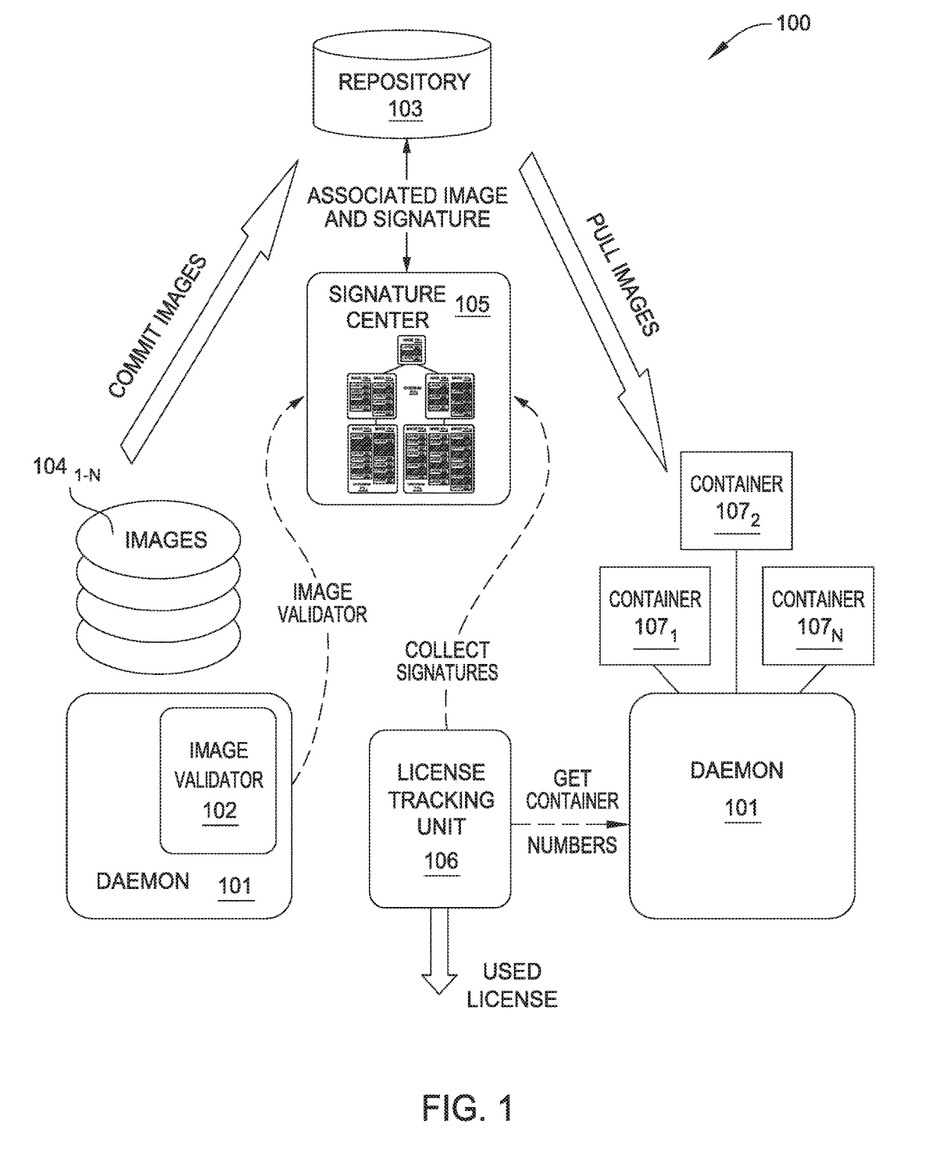
FIG. 1 illustrates an example system architecture which determines license use for composed container services in cloud platforms, according to one embodiment.

FIG. 1 illustrates an example system architecture 100 which determines license use for composed container services in cloud platforms, according to one embodiment. As shown, the system 100 includes a daemon 101, a repository 103, a plurality of software container images $104_{1-N}$, signature center 105, a license tracking unit 106, and a plurality of containers $107_{1-N}$. The daemon 101 is a self-sufficient, persistent runtime process that manages containerized images, such as the container images $104_{1-N}$ and the containers $107_{1-N}$. Generally, a user may use the daemon 101 to create a container image $104_N$ and commit the container image $104_N$ to the repository 103. Once committed to the repository 103, the container images $104_{1-N}$ are publicly accessible for deployment as containers $107_{1-N}$ via the daemon 101. The container images $104_{1-N}$ are containerized images that include at least one software application that is wrapped in a complete filesystem that contains all components (e.g., the software's application code, scripts, configuration information, runtime, system tools, system libraries, and the like) needed to execute the application on a server. While the system 100 is representative of any type of containerized image platform, one example of the system 100 is the Docker® software containerization platform, where the daemon 101 is the Docker daemon, and the repository 103 is the Docker Hub. (Docker is a registered trademark of Docker, Inc.).

The images $104_{1-N}$ may be rebuilt or extended from other images $104_{1-N}$, meaning that any given image $104_N$ can be composed of hundreds of layers of other images $104_{1-N}$ in a chain. The components of each image $104_{1-N}$ may be covered by a software license which governs the terms of the use of the software components of each image $104_N$. For example, a license may grant the authority to use the software with or without compensation to the licensor. As such, the daemon 101 must be able to track the licenses for each piece of software in each layer of an image $104_N$, and track the subsequent use of the licensed software (e.g., when the images $104_{1-N}$ are deployed as containers $107_{1-N}$ in the system 100). In at least one embodiment, the license terms of a given piece of software are stored as metadata of each image $104_{1-N}$.

As shown, the daemon 101 includes an image validator 102, which is configured to validate each layer of each image $104_{1-N}$ as a precondition to committing the images $104_{1-N}$ to the repository 103. The image validator 102 is further configured to compute one or more signature values for each image $104_{1-N}$, and update the signature center 105 to reflect the computed signature values for each image $104_{1-N}$. Generally, in validating an image $104_{1-N}$, the image validator 102 will determine whether each layer of the image $104_{1-N}$ has an associated entry in the signature center 105. To validate new images $104_{1-N}$ (e.g., images that are not extended from existing images), the image validator 102 may create a new entry in the signature center 105.

Stated differently, to validate an image, the image validator 102 must determine that each layer of the image $104_N$ is traceable and eligible for license tracking via a signature. The validity of an image $104_N$ may be determined by the other images $104_{1-N}$ from which it extends. For example, if image $104_1$ extends from image $104_2$, and image $104_2$ extends from image $104_3$, image $104_1$ is valid when image $104_2$ is valid, and image $104_2$ is valid when image $104_3$ is valid. Therefore, the image $104_1$ is valid only when images $104_{2,3}$ are also valid. As previously indicated, the image validator 102 determines whether an image $104_N$ is valid based on whether the signature center 105 includes a corresponding signature value for the image $104_N$.

The signature center 105 stores signature values for the images $104_{1-N}$ and associates signature values with the images $104_{1-N}$ stored in the repository 103. The signature center 105 also provides application program interfaces (APIs) which allow the daemon 101 and/or the license tracking unit 106 to query the signature values for images $104_{1-N}$. Generally, the signature center 105 stores signature values in one or more tree data structures. An example of such a structure is described in greater detail with reference to FIG. 2. Each node of each tree in the signature center 105 has one identifier, namely the signature checksum for the node (and the associated image $104_N$). Each node further maintains a list of the images $104_{1-N}$ that it binds. Furthermore, each node in each tree in the signature center 105 has only one ancestor node (with the exception of the root node, which has no ancestors).

Once an image $104_N$ has been verified and committed to the repository 103, users may execute the software application in the image $104_N$ using the daemon 101 executing on one or more host machines (not pictured) in the system 100. Generally, a user may specify to create one or more instances of a given image $104_N$ via the daemon 101. If the images $104_{1-N}$ are not locally available, a "pull" operation may specify to download one or more images $104_{1-N}$ from the repository 103 into the local file system maintained by the daemon 101. In response, the daemon 101 may launch a container $107_N$ for each instance of the image $104_{1-N}$ requested by the user. Generally, each container $107_{1-N}$ is an execution instance of a single image $104_{1-N}$. When a container $107_N$ is created from an image $104_N$ and executed, all of the layers in the image $104_N$ are in use. Each container $107_{1-N}$ may have a unique identifier. For example, a user may specify to launch a single execution instance of images $104_1$ and $104_2$, respectively. The daemon 101 may then retrieve the images $104_{1,2}$ (if not already locally present) from the repository 101, and spawn the container $107_1$ for image $104_1$ and the container $107_2$ for image $104_2$ on one or more host machines in the system 100. Therefore, licensed software may be used when the instances of the images $104_{1,2}$ are deployed as the containers $107_{1,2}$.

The license tracking unit 106 is a component of the daemon 101 that tracks which software licenses are used when one of the containers $107_{1-N}$ is deployed in the system 100. Generally, the license tracking unit 106 determines which software licenses are used by a given containers $107_{1-N}$ by receiving, from the daemon 101, identifiers of each container $107_{1-N}$ deployed by the daemon 101 and collecting the associated signatures for each identified container $107_{1-N}$ from the signature center 105. The license tracking unit 106 may then determine the number of containers $107_{1-N}$ and the corresponding signatures to determine which licenses have been used in spawning the containers $107_{1-N}$. In one embodiment, the license tracking unit 106 makes the determination based on a cost for spawning the containers $107_{1-N}$ based on license terms of each piece of licensed software.

Figure 2:
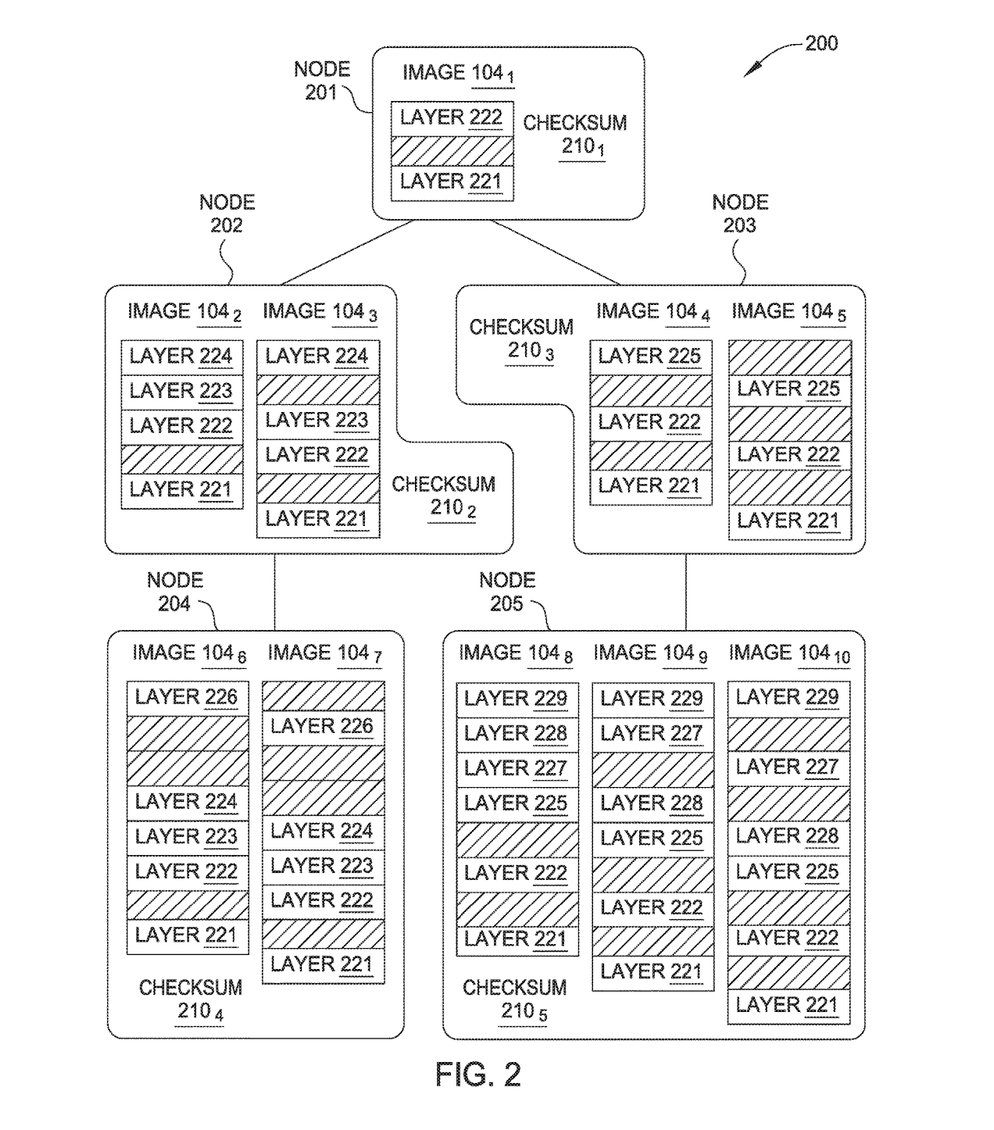
FIG. 2 illustrates an example tree stored in a signature center, according to one embodiment.

FIG. 2 illustrates an example signature tree 200 stored in the signature center 105, according to one embodiment. As indicated, the signature center 105 stores image signatures and an association between the stored signatures with the corresponding images $104_{1-N}$ in the repository 103. To do so, in one embodiment, the signature center 105 stores the signatures in a tree data structure, such as the signature tree 200. However, the images $104_{1-N}$ in the repository 103 may be associated via an image tree data structure (not shown). Unlike the image tree data structure in the repository 103, the signature tree 200 does not record complete relationships between images. Indeed, an image $104_{1-N}$ is not required to have a license, as the tree 200 allows images to share the license of ancestor images $104_{1-N}$. As such, when tracking license use of a given image, the tree 200 allows the license use of ancestors to be tracked, providing flexible license tracking, such as in cases where use of an image layer is free. Furthermore, the image tree data structure of the repository 103 may be lost when an "export" command generates a new image package. However, the signature tree 200 facilitates tracking the signatures for each layer in an exported image.

As shown, the signature tree 200 includes a root node 201 that has a checksum $210_1$ as its identifier, also referred to as the signature checksum for node 201. As previously indicated, because multiple images can share one signature, each node of the signature tree 200 includes a list of the images that it binds. In other words, one signature (e.g., the signature checksum $210_1$) can map to multiple images, so each node of the signature tree 200 maintains a list of associated images. Therefore, node 201 lists image $104_1$ as being bound to node 201 and the corresponding signature checksum $210_1$. As shown, image $104_1$ includes a layer 221 and a layer 222 (which encapsulate an empty layer, indicated by dashed lines). Therefore, each node of the signature tree 200 records an ordered list of layers in each image. The root node 201 corresponds to an original image $104_N$, which extends from no ancestor images. However, as indicated, the signature center 105 may have multiple signature trees, where the root node of each signature tree in the signature center 105 is associated with an original image.

As shown, nodes 202, 203 have the root node 201 as an ancestor, and have checksum values $210_{2,3}$ as respective checksum values. As shown, node 202 binds images $104_{2,3}$, each of which extend from image $104_1$. The images $104_{2,3}$ extend from image $104_1$ in that each image $104_{2,3}$ include layers 221,222, but also include additional layers 223-224. Similarly, node 203 binds images $104_{4,5}$, each of which extend from image $104_1$ in that the images $104_{4,5}$ include layers 221,222 and also include additional layer 225.

As shown, node 204 is a child node of node 202 and node 205 is a child of node 203. Node 204 has an associated checksum value of checksum $210_4$, which binds images $104_{6,7}$. Images $104_{6,7}$ extend from images $104_{2,3}$, i.e., images $104_{6,7}$ include layers 221-224 and new layer 226. Node 205 has a checksum value of $210_5$, and binds images $104_{8-10}$. Images $104_{8-10}$ extend from images $104_{4,5}$ in that images $104_{8-10}$ include layers 221-222 and 225, as well as additional layers 227-229.

The path from any given non-root node in the signature tree 200 to the root node 201 includes all of the signature checksum values needed to track the license use of the images the non-root nodes bind. Therefore, querying the signature tree 200 includes traversing the path from one of the nodes 201-205 back to the root node 201, collecting all signature checksums $210_{1-5}$ on the path. For example, a query of signature tree 200 for the root node 201 returns the signature checksum $210_1$, while a query of signature tree 200 for the node 204 returns signature checksums $210_1$, $210_2$, and $210_4$.

In one embodiment, to compute a given signature checksum $210_{1-5}$ for a corresponding node 201-205, the image validator 102 (or a component of the signature center 103) may perform the following operations. First, the image validator 102 may compute a file checksum for each file in each layer of the image, e.g., layers 221-224 of image $104_2$. The file checksum may be computed using a hash function that is applied to the payload of each file in the layers and a selected set attributes, e.g., file_checksum=hash(selected_attributes+file_payload). The payload of a file refers to the physical data stored on a storage medium that represents the file. The set of attributes of a file may be defined by a user, and may include the license units, file name, identifiers, and the like.

Once the file checksum is computed for a layer (e.g., layer 221), the image validator 102 may compute a layer checksum for the layer. The layer checksum may be computed based on an ordered list of the file checksums of each layer, e.g., layer_checksum=hash(ordered list of file_checksums). Doing so considers the order of layers in an image, as each image may have the same layers in different orders (as well as any number of empty or free layers). The image validator 102 may then compute a license checksum value for the layer, which is based on the layer checksum and a license label. The license label is a string including the license information for a given layer. Therefore, the license checksum value for the layer may be computed by: layer_license_checksum=hash(layer_checksum+license label). The image validator 102 may then compute the node checksum 210 for the node based on the ordered license checksums of each layer in the image. Therefore, the node checksum 210 may be computed as: node_checksum=hash (ordered list of layer_license_checksums). In some embodiments, each node of the signature tree 200 stores each of the computed file checksums, layer checksums, license layer checksums, and node checksums.

In some embodiments, a user committing an image $104_N$ to the repository 103 may have options with regard to license tracking. For example, once validated, the image validator 102 either generates a new signature checksum, or uses the ancestor node's signature checksum based on user input. If the user does not want the new layers which are extended to the image to be tracked for license use, the image validator 102 will locate the node in the signature tree 200 which corresponds to the image $104_N$ (e.g., node 203), and identify the signature checksum of the node's direct ancestor (e.g., checksum $210_1$ of node 201). The identified signature checksum of the ancestor node may then be used as the signature checksum of the new image. However, if the user wishes to track the new layers of the image, the image validator 102 will compute a signature checksum value for the node for the extended image as described above.

If an image is assigned an existing signature, validating the image includes adding the image to the list of images that are bound by the node associated with the existing signature (e.g., adding image $104_{10}$ to node 205). If a new signature checksum is created for an image, a new node will be created and appended to the signature tree 200 as the child to the node which was the last node verified in the validating step. A special case exists where the image validator 102 determines that the image is an original image. In such a case, a signature checksum is generated and a new root node is created (e.g., a new tree is created in the signature center 103). This node may then grow into a new, separate tree data structure as images are extended from the new original image.

Figure 3:
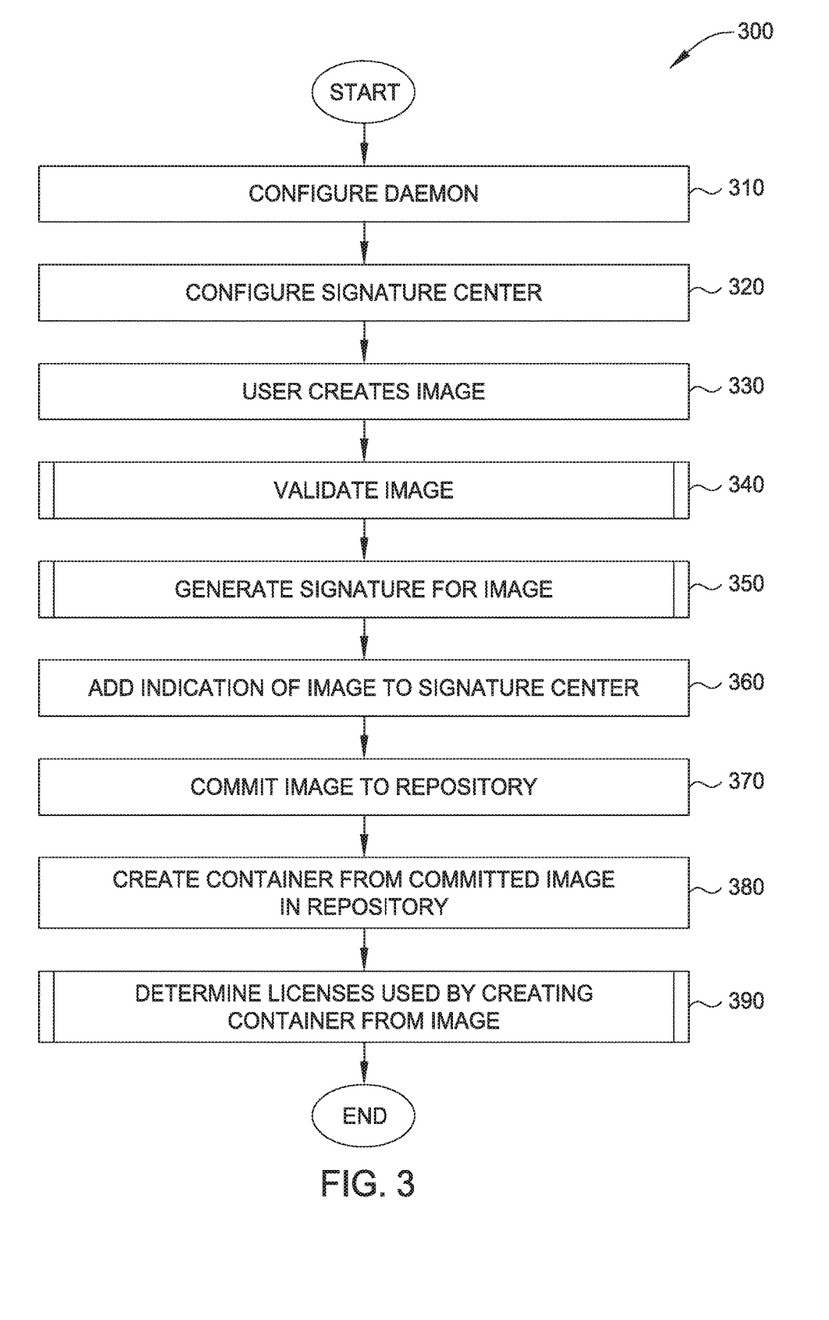
FIG. 3 is a flow chart illustrating an example method to determine license use for composed container services in cloud platforms, according to one embodiment.

FIG. 3 is a flow chart illustrating an example method 300 to determine license use for composed container services in cloud platforms, according to one embodiment. As shown, the method 300 begins at block 310, where the daemon 101 is configured to include the image validator 102 and license tracking unit 106. The daemon 101 may also be further configured to modify the "export" command to maintain the information regarding the exported images in the signature center 105. At block 320, the signature center 105 is configured to store all signatures for images, and associate the signatures to images in the repository 103. The signature center 105 (and/or the image validator 102) is also configured to generate new signatures for images committed to the repository, and provide APIs to allow the daemon 101 and its components to query the signature center 105.

At block 330, a user may create an image. The image is generally a containerized image that may be an original image, or an image extended from other existing images. At block 340, described in greater detail with reference to FIG. 4, the image validator 102 may validate the image. Generally, in validating the image, the image validator 102 ensures that an image is either an original image, or an extended image whose layers each have a signature stored in the signature center 105. At block 350, described in greater detail with reference to FIG. 5, the image validator 102 (and/or a component of the signature center 105) may generate a signature for the image. As previously indicated, each node of the signature tree 200 has a unique signature used to track image layers. Therefore, the image validator 102 may determine whether a signature exists in the signature center 105 for an image that is extended from other images (or is a copy of other images). If the signature center 105 does not include a signature for the image, the image validator 102 computes a new signature for the image.

At block 360, the image validator 102 and/or a component of the signature center 105 adds an indication of the image to the signature center 105. If the image is given an existing signature, the image is added to the corresponding node of the signature tree 200 in the signature center 105. However, if the image is an extended image that does not have an associated signature in the signature center 105, the image validator 102 may compute a signature value for the image, and add the signature as a new node in the signature tree 200. If the image is an original image, the image validator 102 may compute a signature checksum for the original image, and create a new root node for a new signature tree in the signature center 105.

At block 370, the daemon 101 may commit the image to the repository 103. In at least one embodiment, the daemon 101 only commits the image upon validating the image, generating a signature for the image, and adding an indication of the image to the signature center 105. At block 380, the repository 103 may receive a request to create a container from an image in the repository 103. For example, a user of the daemon 101 may specify to pull the image committed at block 370, and spawn multiple instances of the image in containers in a cloud computing environment. At block 390, described in greater detail with reference to FIG. 6, the license tracking unit 106 may determine the licenses used by creating the containers from the image. Generally, to determine what licenses are used, the license tracking unit 106 receives the signatures for each layer of the image from the signature center 105, which are then applied to each instance of the image spawned as a container.

Figure 4:
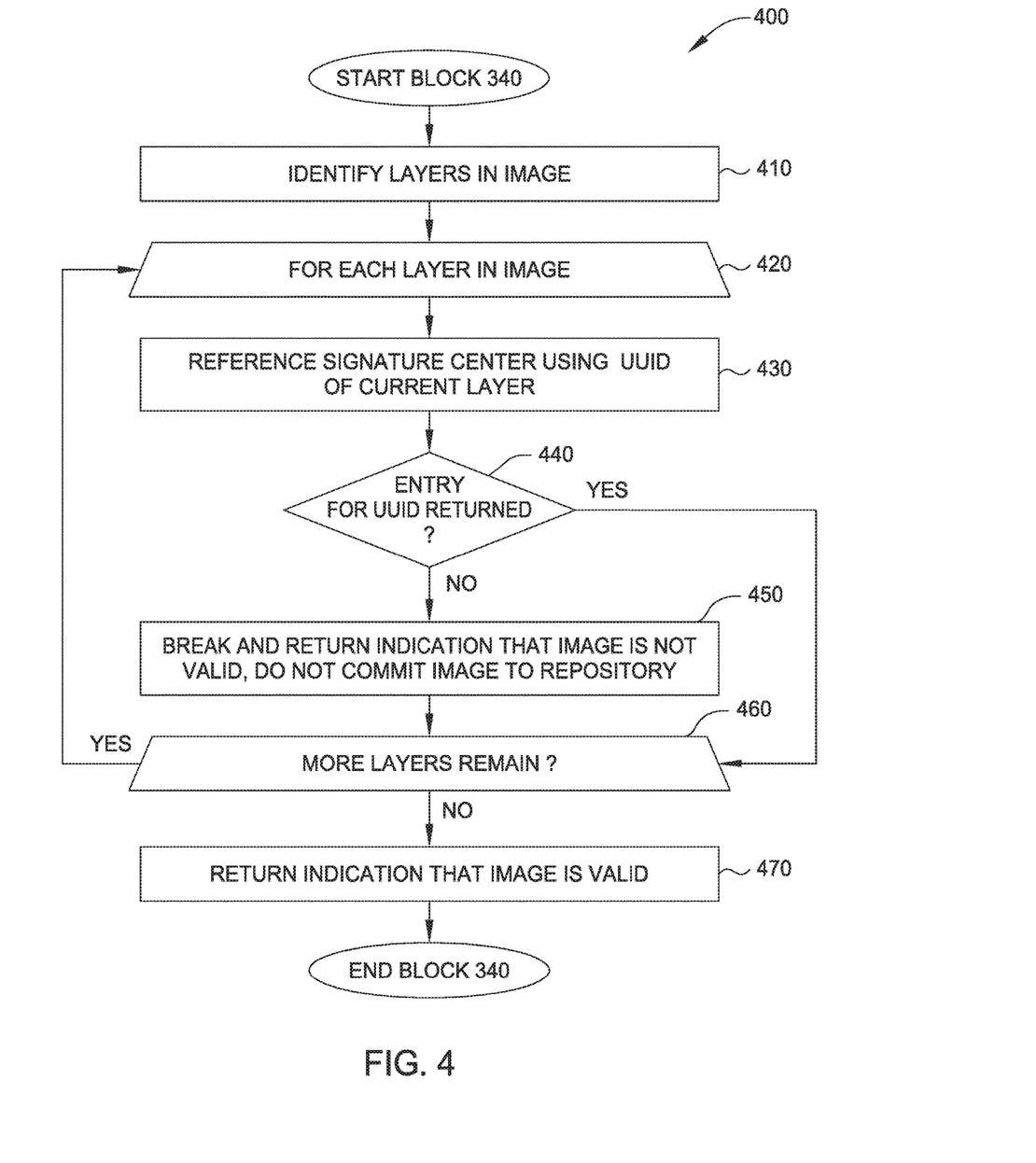
FIG. 4 is a flow chart illustrating an example method to validate an image, according to one embodiment.

FIG. 4 is a flow chart illustrating an example method 400 corresponding to block 340 to validate an image, according to one embodiment. The daemon 101 and/or the image validator 102 may execute the method 400. As shown, the method 400 begins at block 410, where the daemon 101 may identify the layers in the image created by the user. In at least one embodiment, the layers are identified by metadata (e.g., UUIDs) in the image file. At block 420, the image validator 102 executes a loop including blocks 430-460 for each layer in the image. At block 430, the image validator 102 may query the signature center 105 using the UUID of the current layer of the image. In one embodiment, the image validator 102 provides the UUID to an API of the signature center 105. The API of the signature center 105 may reference the mappings between the UUIDs of images in the repository 103 and the signatures in the signature center 105. The API may then return an indication as to whether an entry is found which associates the UUID to a signature in the signature center.

At block 440, the image validator 102 determines whether the signature center 105 returned an indication that a signature for the UUID of the current image layer exists. If an entry was not returned, a signature for the current image layer does not exist, and the image cannot be validated. As such, the method proceeds to block 450, where the image validator 102 breaks execution of the method 400, returns an indication that the image is not valid, and the daemon 101 may block the image from being committed to the repository 103. Returning to block 440, if an entry for the current UUID is returned by the signature center, the method proceeds to block 460. At block 460, the image validator 102 determines whether more layers remain in the image. If more layers of the image remain, the image validator 102 returns to block 420 to validate the remaining image layers. If no more layers remain, the image validator 102 proceeds to block 470, where the image validator 102 returns an indication that the image is valid, and the daemon 101 can proceed with the subsequent commit of the image to the repository 103.

Figure 5:
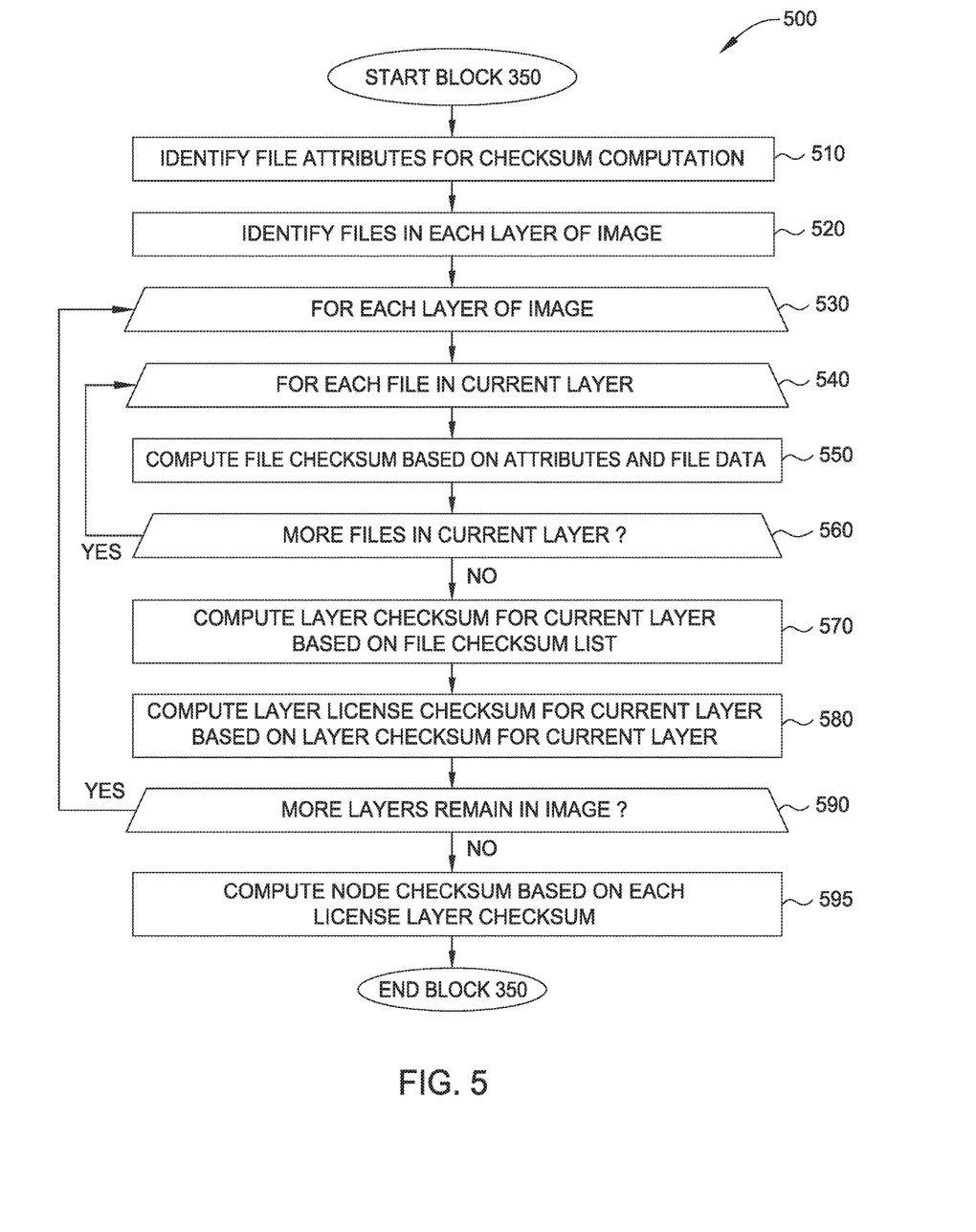
FIG. 5 is a flow chart illustrating an example method to generate signatures for images, according to one embodiment.

FIG. 5 is a flow chart illustrating an example method 500 corresponding to block 350 to generate signatures for images, according to one embodiment. As shown, the method 500 begins at block 510, where the image validator 102 determines the file attributes used to compute checksums. The file attributes may include metadata of a file, license information for the file, and the like. In at least one embodiment, a user may specify the file attributes. At block 520, the image validator 102 identifies the files in each layer of the image. At block 530, the image validator 102 executes a loop including blocks 540-590 for each layer of the image. At block 540, the image validator 102 executes a loop including block 550 for each file in the current layer of the image. At block 550, the image validator 102 computes a file checksum for the current file based on a hash function applied to the data of the file on a storage device and the file attributes identified at block 510. In at least one embodiment, the image validator 102 stores the computed file checksum in an ordered list of file checksums. As previously indicated, the equation to compute the file checksum may be file_checksum=hash(selected_attributes+file data). At block 560, the image validator 102 determines whether more files remain in the current layer of the image. If more files remain, the image validator 102 returns to block 530. If no more files remain, the image validator 102 proceeds to block 570.

At block 570, the image validator 102 computes the layer checksum for the current layer using a hash function applied to the file checksums computed at block 550. In at least one embodiment, the layer checksum is computed based on the ordered list of file checksums created by the image validator 102. As previously indicated, the equation to compute the layer checksum is: layer_checksum=hash(ordered list of file_checksums). At block 580, the image validator 102 computes a layer license checksum for the current layer using a hash function applied to the layer checksum for the current layer. As previously indicated, in one embodiment, the equation to compute the layer license checksum is: layer_license_checksum=hash(layer_checksum+license label). In at least one embodiment, the image validator 102 maintains an ordered list of layer license checksums, which captures the specific layering of the image.

At block 590, the image validator 102 determines whether more layers remain in the image. If more layers remain, the image validator 102 returns to block 530. If no more layers remain, the image validator 102 proceeds to block 595, where the image validator 102 computes the node checksum for the node based on the ordered license checksums of each layer in the image. As previously indicated, the node checksum may be computed as: node_checksum=hash(ordered list of layer_license_checksums). The image validator 102 may then provide the computed values to the signature center 105, which updates the signature trees (or creates a new signature tree) accordingly.

Figure 6:
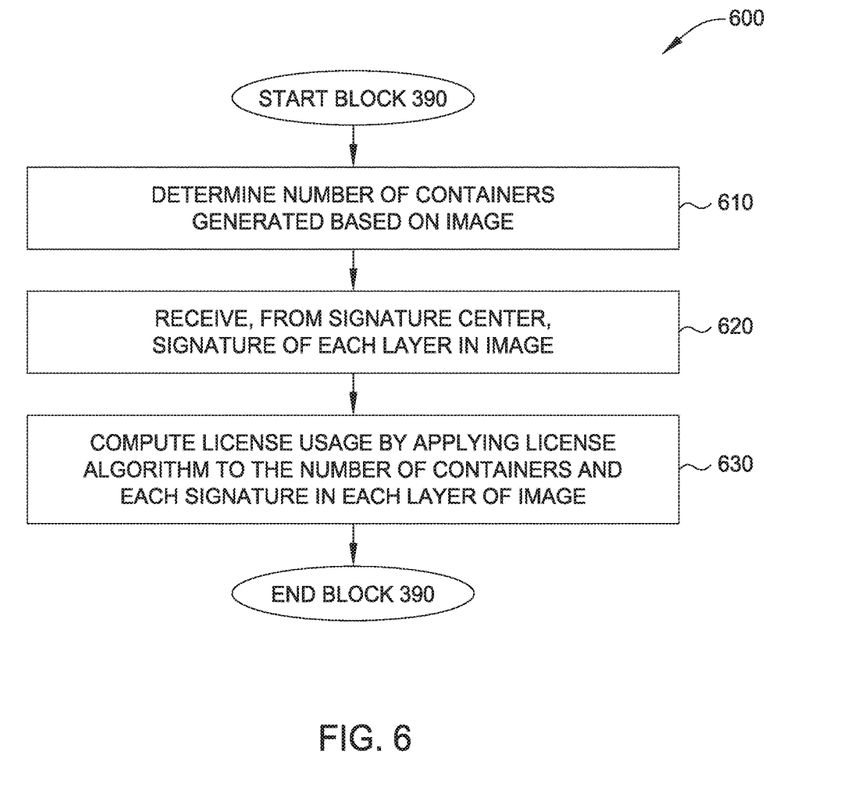
FIG. 6 is a flow chart illustrating an example method to determine the licenses used by creating containers from an image, according to one embodiment.

FIG. 6 is a flow chart illustrating an example method 600 corresponding to block 390 to determine the licenses used by creating containers from an image, according to one embodiment. As shown, the method begins at block 610, where the daemon 101 determines the number of containers generated based on the image at block 380. Generally, the daemon 101 is aware of the number of containers generated based on an image, and may provide a UUID of each container to the license tracking unit 106. Doing so allows the license tracking unit 106 to multiply the license value for a given image by the number of containers that are spawned based on the image. At block 390, the image validator 102 may query the signature center 105 using the UUIDs of the containers, and receive the signature of each layer in the image. Generally, the signature center 105 may traverse the tree corresponding to the image associated with the container, and collects each signature on a path from the node containing the image to the root node. These signatures may then be returned to the license tracking unit 106. At block 630, the license tracking unit 106 may compute the licenses used by deploying the containers in the cloud by applying a predefined licensing algorithm to the number of containers and each signature in each layer of the image. Doing so may produce a licensing value for deploying the image as containers in the cloud platform.

Figure 7:
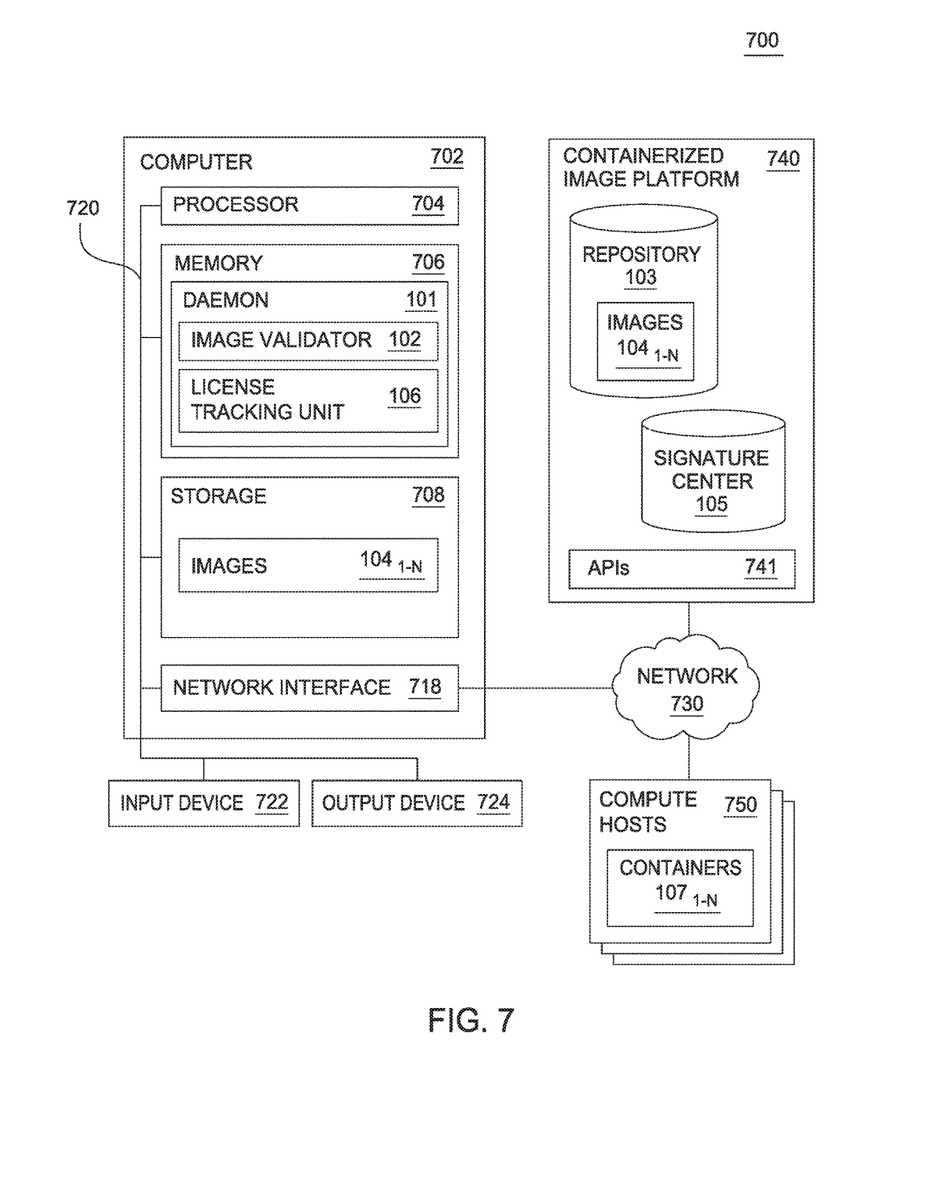
FIG. 7 illustrates an example system which determines license use for composed container services in cloud platforms, according to one embodiment.

FIG. 7 illustrates an example system 700 which determines license use for composed container services in cloud platforms, according to one embodiment. The networked system 700 includes a computer 702. The computer 702 may also be connected to other computers via a network 730. In general, the network 730 may be a telecommunications network and/or a wide area network (WAN). In a particular embodiment, the network 730 is the Internet.

The computer 702 generally includes a processor 704 which obtains instructions and data via a bus 720 from a memory 706 and/or a storage 708. The computer 702 may also include one or more network interface devices 718, input devices 722, and output devices 724 connected to the bus 720. The computer 702 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computer 702 to communicate with other computers via the network 730.

The storage 708 is representative of hard-disk drives, solid state drives, flash memory devices, optical media and the like. Generally, the storage 708 stores application programs and data for use by the computer 702. In addition, the memory 706 and the storage 708 may be considered to include memory physically located elsewhere; for example, on another computer coupled to the computer 702 via the bus 720.

The input device 722 may be any device for providing input to the computer 702. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computer 702. The output device 724 may include output devices such as monitors, touch screen displays, and so on.

As shown, the memory 706 contains the daemon 101, which includes the image validator 102 and license tracking unit 106. Generally, a user may use the daemon 101 to commit an image $104_N$ from the storage 708 to the repository 103 of the containerized image platform 740. As previously discussed, the daemon 101 may invoke the image validator 102 to validate the image $104_N$ prior to committing the image $104_N$ to the repository 103. In addition, a signature for the image $104_N$ may be computed and added to the signature center 105 of the containerized image platform 740. The containerized image platform 740, as shown, includes the repository 103, signature center 105, and a set of APIs 741. The APIs 741 facilitate communication between the daemon 101 (and its components) and the repository 103 and/or signature center 105.

As shown, cloud compute hosts 750 execute containers $107_{1-N}$. As indicated, a user of the daemon 101 may specify to spawn instances of the images $104_{1-N}$ as the containers $107_{1-N}$ on the compute hosts 750. As such, the license tracking unit 106 may compute the licenses used in spawning the containers $107_{1-N}$ based on the images $104_{1-N}$ in the repository 103.

Advantageously, embodiments disclosed herein provide efficient techniques to track and compute license use for composed container services in a cloud platform. Doing so ensures that images committed are valid for license tracking, and provides a lightweight way to compute the actual license use when the images are spawned as containers in a cloud platform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the user daemon 101 could execute on a computing system in the cloud. In such a case, the daemon 101 and/or the license tracking unit 106 may store license use for deployed containers at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving an indication to commit a first containerized image to an image repository, wherein the first containerized image is extended from a second containerized image and comprises a plurality of image layers including a first image layer and a plurality of image layers of the second containerized image;
validating the first containerized image by:
determining that: (i) the second containerized image is associated with a first node of a first tree data structure, (ii) the first image layer is not associated with any nodes of the first tree data structure, and (iii) each remaining image layer of the first containerized image is associated with a respective node of the first tree data structure;
generating a first signature value for the first containerized image;
generating a second node in the first tree data structure, wherein the second node stores an indication of the first signature value, the first containerized image, and an ordered list of each of the plurality of image layers of the first containerized image: and
committing the first containerized image to the repository by operation of a computer processor.

2. The method of claim 1, wherein the second node is a child node of the first node, wherein the indication to commit the first containerized image is received from a daemon, wherein generating the first signature value comprises:
computing a file checksum for each file in each image layer of the first containerized image by applying a hash function to each file;
for each image layer of the first containerized image, computing a layer checksum for each layer of the first containerized image by applying the hash function to an ordered list of file checksums;
computing a layer license checksum for each image layer of the first containerized image by applying the hash function to the layer checksum of each image layer; and
computing the first signature value by applying the hash function to each image layer license checksum.

3. The method of claim 1, further comprising:
upon determining that the second containerized image is an original image, determining whether the second node of the first tree data structure is a root node associated with the second containerized image.

4. The method of claim 3, further comprising:
upon determining that a third image layer of the plurality of image layers of the first containerized image is not associated with a node of the first tree data structure, preventing the first containerized image from being committed to the repository.

5. The method of claim 4,
wherein each node of the first tree data structure is identified by a respective signature value,
wherein each node of the first tree data structure stores: (i) the respective signature value, an indication of each containerized image associated with the respective node, and (ii) an ordered list of image layers of each containerized image associated with the respective node, wherein the first tree data structure is one of a plurality of tree data structures, wherein a root node of each of the plurality of tree data structures is associated with a respective new containerized image that is not extended from another containerized image.

6. The method of claim 5, further comprising:
receiving, from the daemon, a request to deploy one or more instances of the first containerized image in a cloud computing platform;
determining a number of containers created to execute the one or more instances of the first containerized image in the cloud computing platform, wherein each container executes a respective instance of the one or more instances of the first containerized images;
referencing the first tree data structure using an identifier of the first containerized image;
receiving, from the first tree data structure, the first signature value; and
computing a licensing cost for deploying the one or more instances of the first containerized image in the cloud computing platform based on a licensing algorithm applied to the first signature value and the number of containers created to execute the one or more instances of the first containerized image in the cloud computing platform.

7. The method of claim 6, wherein referencing the first tree data structure using the identifier comprises:
identifying the first node in the first tree data structure associated with the identifier of the first containerized image;
traversing from the first node to the root node of the first tree data structure; and
returning each signature value of each node traversed from the first node to the root node of the first tree data structure, wherein the licensing algorithm is further applied to each returned signature value.

8. A non-transitory computer program product, comprising:
a non-transitory computer-readable storage medium having computer readable program code embodied therewith, the computer readable program code executable by a processor to perform an operation comprising:
receiving an indication to commit a first containerized image to an image repository, wherein the first containerized image is extended from a second containerized image and comprises a plurality of image layers including a first image layer and a plurality of image layers of the second containerized image:

validating the first containerized image by:
    determining that whether: (i) the second containerized image is associated with a first node of a first tree data structure, (ii) the first image layer is not associated with any nodes of the first tree data structure, and (iii) each remaining image layer of the first containerized image is associated with a respective node of the first tree data structure;
    generating a first signature value for the first containerized image;
    generating a second node in the first tree data structure, wherein the second node stores an indication of the first signature value, the first containerized image, and an ordered list of each of the plurality of image layers of the first containerized image; and committing the first containerized image to the repository.

9. The computer program product of claim 8, wherein the second node is a child node of the first node, wherein the indication to commit the first containerized image is received from a daemon, wherein generating the first signature value comprises:
    computing a file checksum for each file in each image layer of the first containerized image by applying a hash function to each file;
    for each image layer of the first containerized image, computing a layer checksum for each layer of the first containerized image by applying the hash function to an ordered list of file checksums;
    computing a layer license checksum for each image layer of the first containerized image by applying the hash function to the layer checksum of each image layer; and
    computing the first signature value by applying the hash function to each image layer license checksum.

10. The non-transitory computer program product of claim 8, the operation further comprising:
    upon determining that the second containerized image is an original image, determining whether the second node of the first tree data structure is a root node associated with the second containerized image.

11. The non-transitory computer program product of claim 10, the operation further comprising:
    upon determining that a third image layer of the plurality of image layers of the first containerized image is not associated with a node of the first tree data structure, preventing the first containerized image from being committed to the repository.

12. The non-transitory computer program product of claim 11, wherein each node of the first tree data structure is identified by a respective signature value, wherein each node of the first tree data structure stores: (i) the respective signature value, an indication of each containerized image associated with the respective node, and (ii) an ordered list of image layers of each containerized image associated with the respective node, wherein the first tree data structure is one of a plurality of tree data structures, wherein a root node of each of the plurality of tree data structures is associated with a respective new containerized image that is not extended from another containerized image.

13. The non-transitory computer program product of claim 12, the operation further comprising:
    receiving, from the daemon, a request to deploy one or more instances of the first containerized image in a cloud computing platform;
    determining a number of containers created to execute the one or more instances of the first containerized image in the cloud computing platform, wherein each container executes a respective instance of the one or more instances of the first containerized images;
    referencing the first tree data structure using an identifier of the first containerized image;
    receiving, from the first tree data structure, the first signature value; and
    computing a licensing cost for deploying the one or more instances of the first containerized image in the cloud computing platform based on a licensing algorithm applied to the first signature value and the number of containers created to execute the one or more instances of the first containerized image in the cloud computing platform.

14. The non-transitory computer program product of claim 13, wherein referencing the first tree data structure using the identifier comprises:
    identifying the first node in the first tree data structure associated with the identifier of the first containerized image;
    traversing from the first node to the root node of the first tree data structure; and
    returning each signature value of each node traversed from the first node to the root node of the first tree data structure, wherein the licensing algorithm is further applied to each returned signature value.

15. A system, comprising:
a processor; and
a memory storing one or more instructions which, when executed by the processor, performs an operation comprising:
    receiving an indication to commit a first containerized image to an image repository, wherein the first containerized image is extended from a second containerized image and comprises a plurality of image layers including a first image layer and a plurality of image layers of the second containerized image;
    validating the first containerized image by:
        determining that: (i) the second containerized image is associated with a first node of a first tree data structure, (ii) the first image layer is not associated with any nodes of the first tree data structure, and (iii) each remaining image layer of the first containerized image is associated with a respective node of the first tree data structure;
        generating a first signature value for the first containerized image;
        generating a second node in the first tree data structure, wherein the second node stores an indication of the first signature value, the first containerized image, and an ordered list of each of the plurality of image layers of the first containerized image; and
    committing the first containerized image to the repository.

16. The system of claim 15, wherein the second node is a child node of the first node, wherein the indication to commit the first containerized image is received from a daemon, wherein generating the first signature value comprises:
    computing a file checksum for each file in each image layer of the first containerized image by applying a hash function to each file;
    for each image layer of the first containerized image, computing a layer checksum for each layer of the first containerized image by applying the hash function to an ordered list of file checksums;

computing a layer license checksum for each image layer of the first containerized image by applying the hash function to the layer checksum of each image layer; and computing the first signature value by applying the hash function to each image layer license checksum.

17. The system of claim 15, the operation further comprising:

upon determining that the second containerized image is an original image, determining whether the second node of the first tree data structure is a root node associated with the original second containerized image.

18. The system of claim 17, the operation further comprising:

upon determining that a third image layer of the plurality of image layers of the first containerized image is not associated with a node of the first tree data structure, preventing the first containerized image from being committed to the repository.

19. The system of claim 18, wherein each node of the first tree data structure is identified by a respective signature value, wherein each node of the first tree data structure stores: (i) the respective signature value, an indication of each containerized image associated with the respective node, and (ii) an ordered list of image layers of each containerized image associated with the respective node, wherein the first tree data structure is one of a plurality of tree data structures, wherein a root node of each of the plurality of tree data structures is associated with a respective new containerized image that is not extended from another containerized image.

20. The system of claim 19, the operation further comprising:

receiving, from the daemon, a request to deploy one or more instances of the first containerized image in a cloud computing platform;

determining a number of containers created to execute the one or more instances of the first containerized image in the cloud computing platform, wherein each container executes a respective instance of the one or more instances of the first containerized images;

referencing the first tree data structure using an identifier of the first containerized image;

receiving, from the first tree data structure, the first signature value; and computing a licensing cost for deploying the one or more instances of the first containerized image in the cloud computing platform based on a licensing algorithm applied to the first signature value and the number of containers created to execute the one or more instances of the first containerized image in the cloud computing platform.

* * * * *